Aug. 22, 1939.  S. GUARNASCHELLI  2,170,557
SUPPORT FOR FLEXIBLE HOSE
Filed March 24, 1938  2 Sheets-Sheet 1
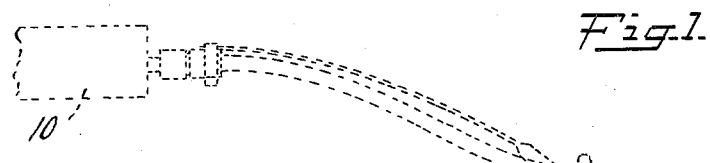
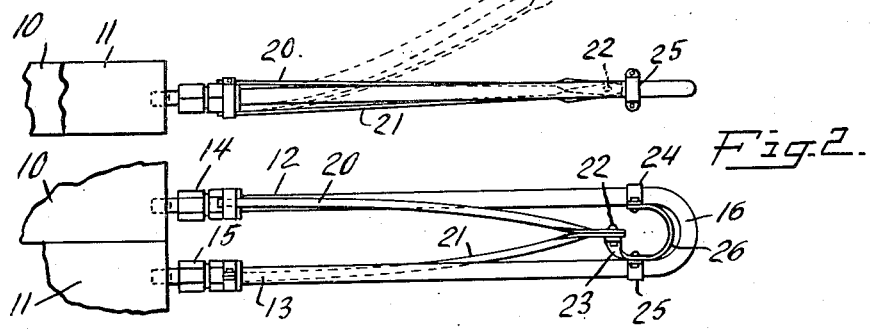
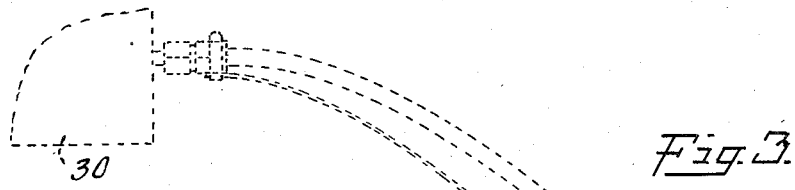
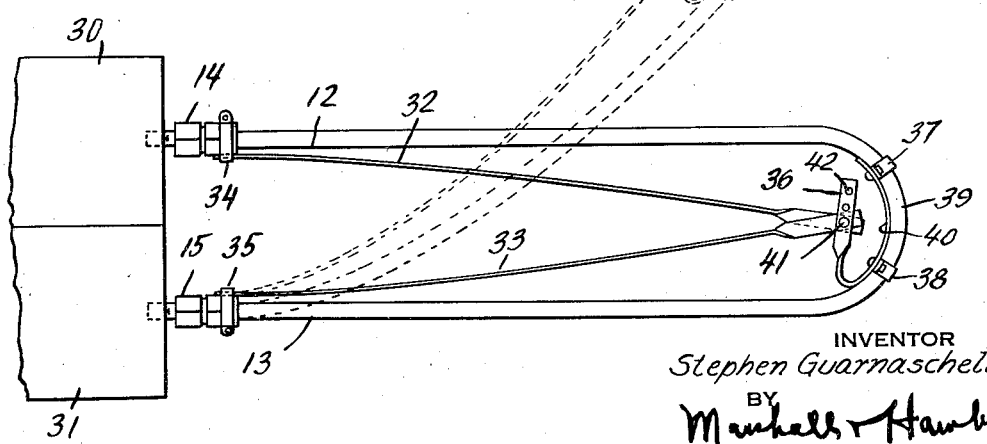
INVENTOR
Stephen Guarnaschelli
BY
Marshall & Hawley
ATTORNEYS Aug. 22, 1939.  S. GUARNASCHELLI  2,170,557
SUPPORT FOR FLEXIBLE HOSE
Filed March 24, 1938  2 Sheets—Sheet 2

INVENTOR
Stephen Guarnaschelli
BY
Marshall Hawley.
ATTORNEYS

Patented Aug. 22, 1939

2,170,557

UNITED STATES PATENT OFFICE 2,170,557

SUPPORT FOR FLEXIBLE HOSE

Stephen Guarnaschelli, Elmhurst, N. Y., assignor to Packless Metal Products Corporation, New York, N. Y., a corporation of Delaware Application March 24, 1938, Serial No. 197,767

5 Claims. (Cl. 138—61)

This invention relates to supports for flexible hose.

Flexible metallic hose is used in platen presses as a conduit between the platens to conduct steam and water from one platen to the other. As the press is opened and the platens move apart, it is essential that the hose be supported in order to eliminate strains or pockets and to insure free positive drainage. Moreover, it is essential that strain on the couplings be eliminated to prevent wear and leakage.

This invention has for its salient object to provide a simple and practical support for flexible hose conduits particularly designed for platen presses and so constructed and arranged as to support the hose in all positions, prevent slack or pockets therein and relieve strain on the hose couplings.

Another object of the invention is to provide a support of the character described so constructed and arranged as to insure free positive drainage.

Further objects of the invention will appear from the following specification taken in connection with the drawings which form a part of this application, and in which Fig. 1 is an elevational view of a hose and hose support constructed in accordance with the invention, the ends of the hose being connected to the platens of a platen press and being shown in dotted lines in a position of maximum separation;

Fig. 2 is a plan view of the structure shown in Fig. 1, with the press closed and the ends of the hose in the position of minimum separation.

Fig. 3 is an elevational view showing a slightly modified form of the invention, the illustration in full lines showing the press platens and hose in closed position and the open position being shown in dotted lines;

Figure 4:
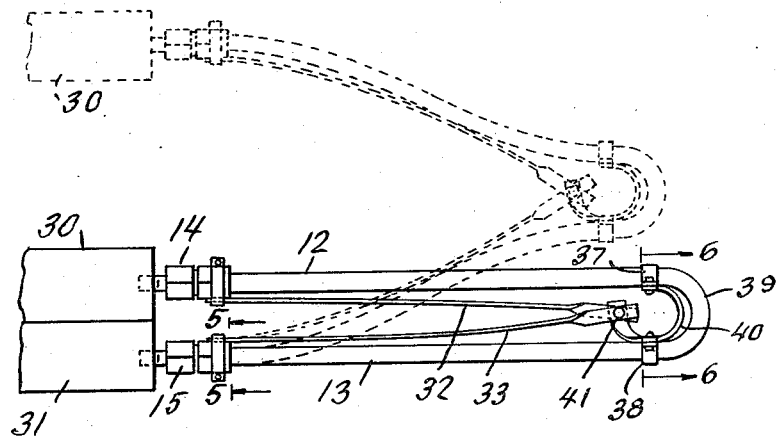
Fig. 4 is a view similar to Fig. 3 but showing a slightly different form of the invention, the press and hose being shown in full lines in closed position and in dotted lines in open position.

The invention briefly described consists of a support for a U-shaped flexible hose or conduit having its ends connected to a pair of platens or members movable vertically relative to each other and comprising means, such as a clamp secured to the bight portion of the hose, fittings or coupling members secured to the ends of the hose and a pair of spring strips or flat metal strips fixed to the fittings and having a pivotal connection to the clamp. This pivotal connection may, if desired, be adjustable and is preferably made to an extension of the clamp in the manner hereinafter described.

Further details of the invention will appear from the following description.

In the embodiment of the invention shown in Figs. 1 and 2, the two platens of a platen press are indicated at 10 and 11. The U-shaped flexible metallic hose has the ends 12 and 13 of its legs fixedly connected through couplings or fittings 14 and 15 to the platens 10 and 11. The bight of the hose is indicated at 16.

The two platens 10 and 11 shown in Figs. 1 and 2 are disposed side by side and separate laterally from the position shown in Fig. 2 to the position shown in Fig. 1.

Fig. 1 shows the press closed in full lines, in which position the two legs 12 and 13 of the U-shaped conduit are disposed in the same horizontal plane. In this figure the dotted lines illustrate the platens 10 and 11 separated vertically, the legs of the conduit or hose being shown in their maximum separated position.

The hose support consists of a pair of flat metal strips 20 and 21 fixedly secured at one end to the couplings or fittings 14 and 15 and pivoted at their other ends, as shown at 22, to an extension 23 of a clamp. The clamp has its ends 24 and 25 secured to the legs of the hose adjacent the bight portion 16 thereof, the ends of the clamp being connected by a U-shaped or curved portion 26 which corresponds in curvature to the curvature of the bight 16 when the press is closed.

From the showing in Figs. 1 and 2 it will be seen that the flat metal strip 20 is disposed above the leg 12 of the hose and a flat metal strip 21 is disposed below the leg 13.

When the press is separated the metal strips 20 and 21 and the connections between the strips and the fittings and between the strips and the clamp will support the hose and prevent sagging thereof. Furthermore, since the extension 23 of the clamp is formed of resilient metal, the strips 20 and 21 will tend to return the hose to a horizontal position when the platens move from the position shown in dotted lines in Fig. 1 to the full line position shown in Figs. 1 and 2.

Fig. 3 illustrates a slightly modified form of the invention in which the platens 30 and 31 are disposed one above the other and are separated vertically from the full line position to the dotted line position when the press is opened.

In this form of the invention the ends 12 and 13 of the hose are connected by couplings 14 and 15 to the platens 30 and 31 in a manner similar to that shown in Figs. 1 and 2.

The hose support comprises a pair of flat spring metal strips 32 and 33 having their inner ends fixedly secured to clamps 34 and 35 secured to the couplings 14 and 15. The strips 32 and 33, as shown, are disposed between the vertically separated legs 12 and 13.

The other ends of the strips are secured to an extension 36 of a clamp comprising clamping members 37 and 38 fixed to the bight portion of the hose shown at 39. The clamping members 37 and 38 are connected by a curved or arcuate strip 40 which is extended beyond the clamp member 38 to form the extension 36. As shown, the outer ends of the strips 32 and 33 are adjustably connected to the extension 36 by a pivot pin 41 which may be inserted in any one of a plurality of pivot openings 42 formed in the extension 36.

When the platens 30 and 31 are separated the strips 32 and 33 will exert a pull on the extension 36 and when they are moved together the resiliency of the extension 36 tends to return them to the position shown in full lines.

Figure 5:
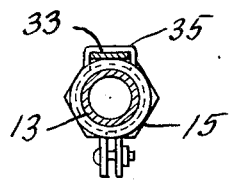
Fig. 5 is a transverse sectional elevation on an enlarged scale, taken substantially on line 5—5 of Fig. 4.
Figure 6:
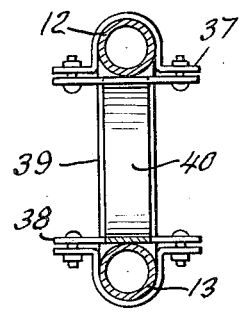
Fig. 6 is a sectional elevation on an enlarged scale, taken substantially on line 6—6 of Fig. 4.

In the form of the invention shown in Figs. 4, 5 and 6, the support is substantially the same as that shown in Fig. 3, but this embodiment of the invention provides for less latitude of separation of the platen members than that shown in Fig. 3. Furthermore, the metal bars or strips are connected to the clamp extension by a pivotal connection thereto and no adjustment is provided for as in Fig. 3.

From the foregoing specification it will be evident that the hose support described will form a simple, practical and efficient support for the hose in all positions of movement thereof. Furthermore, by means of the support all slack and pockets are eliminated and strain on the couplings is also eliminated. Free positive drainage is insured thereby preventing steam or water from being trapped in the hose.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A support for a U-shaped flexible hose having its ends connected to a pair of members movable vertically relative to each other, comprising a clamp secured to the bight portion of the hose, fittings secured to the ends of the hose, and a pair of substantially flat spring strips fixedly secured to said fittings and pivoted to said clamp, said spring strips being disposed between the legs of the U-shaped hose and being arranged to flex as the legs of the hose separate and to straighten the hose legs as the legs are returned to their initial U-shaped relation.

2. A support for a U-shaped flexible hose having its ends connected to a pair of members movable vertically relative to each other, comprising a clamp secured to the bight portion of the hose and having a resilient extension disposed within the bight, fittings secured to the ends of the hose, and a pair of spring strips fixed to said fittings and pivoted to said clamp extension.

3. A support for a U-shaped flexible hose having its ends connected to a pair of members movable vertically relative to each other, comprising a clamp secured to the bight portion of the hose and having a resilient extension disposed within the bight, fittings secured to the ends of the hose, and a pair of strips fixed to said fittings and pivoted to said clamp extension, said resilient extension being placed under tension as the members and legs of the U-shaped hose are separated and thus aiding the return movement of the legs to their initial U-shaped relation and maintaining the hose lengths against sagging.

4. A support for a U-shaped flexible hose having its ends connected to a pair of members movable vertically relative to each other, comprising a clamp secured to and having a curved portion corresponding to the bight portion of the hose, said curved portion having a resilient extension disposed across the bight and movable relative to the curved portion of the clamp, fittings secured to the ends of the hose, and arms pivoted to said resilient extension and fixed to said fittings.

5. A support for a U-shaped flexible hose having its ends connected to a pair of members movable vertically relative to each other, comprising a clamp secured to and having a curved portion corresponding to the bight portion of the hose, said curved portion having a resilient extension disposed across the bight and movable relative to the curved portion of the clamp, fittings secured to the ends of the hose, and resilient arms pivoted to said resilient extension and fixed to said fittings.

STEPHEN GUARNASCHELLI.